Feb. 14, 1939.  K. C. WELCH  2,147,326
LIGHTING FOR ALCOVES
Filed Feb. 24, 1936  3 Sheets-Sheet 1

Inventor
Kenneth C. Welch
By Livname &
Van Antwerp
Attorneys

Feb. 14, 1939.  K. C. WELCH  2,147,326
LIGHTING FOR ALCOVES
Filed Feb. 24, 1936  3 Sheets-Sheet 2
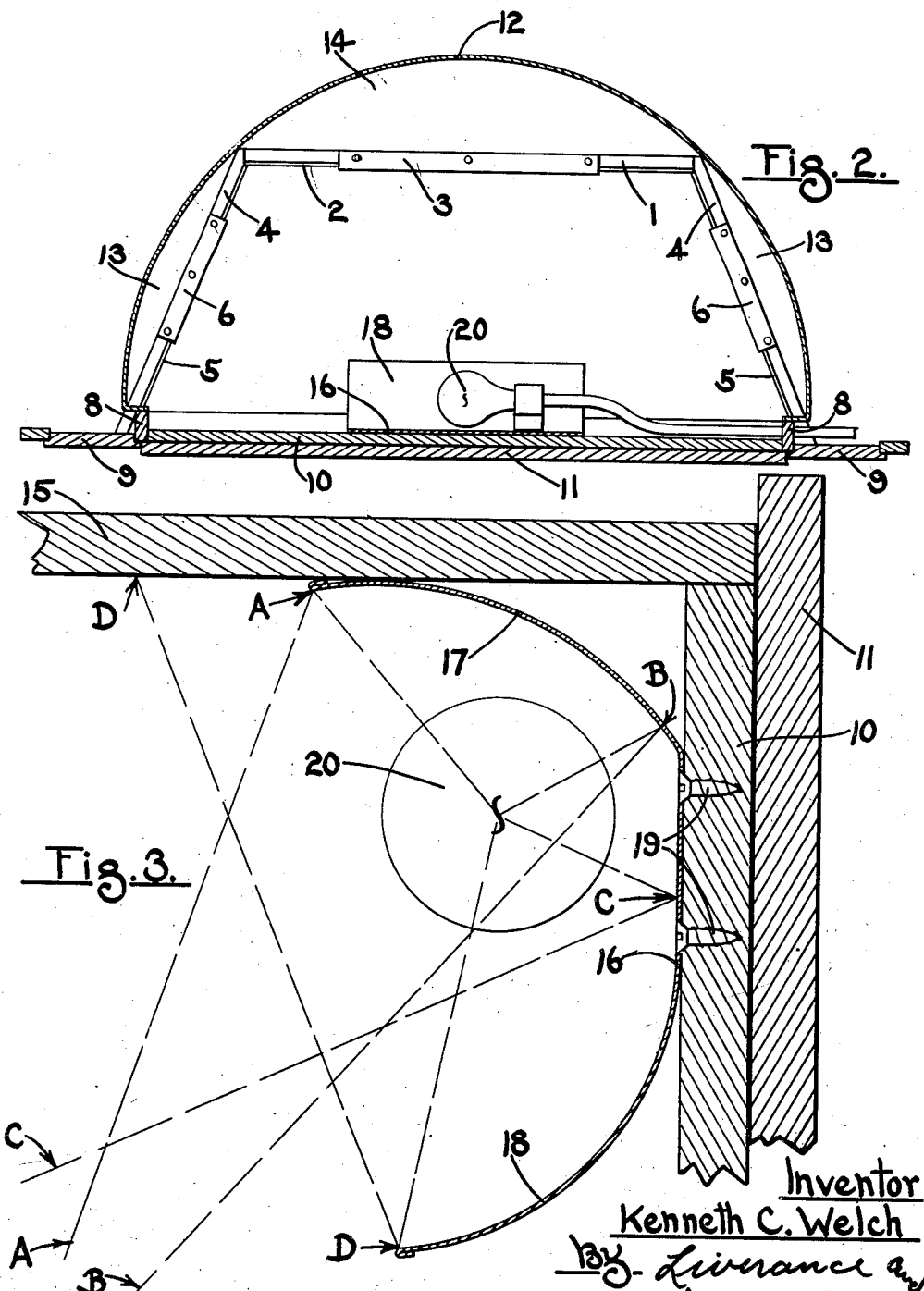

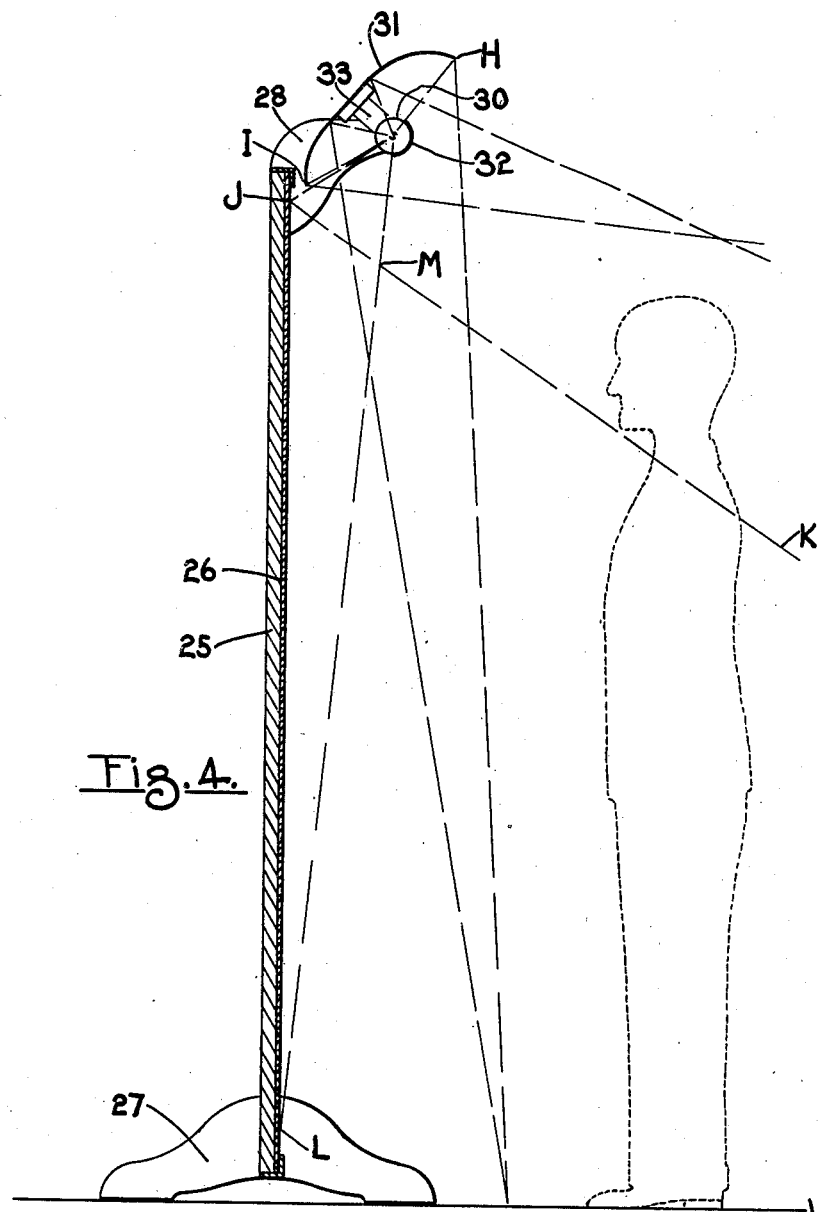

Patented Feb. 14, 1939

2,147,326

UNITED STATES PATENT OFFICE 2,147,326

LIGHTING FOR ALCOVES

Kenneth C. Welch, Grand Rapids, Mich., assignor to Grand Rapids Store Equipment Company, Grand Rapids, Mich., a corporation of Michigan Application February 24, 1936, Serial No. 65,321

2 Claims. (Cl. 240—4.1)

This invention relates to mirror alcoves and particularly to the lighting thereof. The mirror alcove to which this invention especially pertains is that type particularly adapted and intended to be used in clothing stores for the purpose of viewing clothing which is being fitted to the purchaser. This mirror alcove customarily comprises a vertical main mirror and two vertical angularly disposed mirrors at opposite sides of the main mirror and the user stands before these mirrors and may view his reflection therein both from the front and the sides and by turning may also obtain a back view of himself.

Usually it is necessary to provide artificial lighting associated with these mirrors and the object of this invention is to provide such lighting means as will most perfectly illuminate the person from head to foot without unnatural shadows and without subjecting the eyes of the user to the glare of glaring beams of light from the light source either direct or reflected in the mirror. By use of this invention the user may stand before the mirrors at the customary distance therefrom for proper inspection of his attire and in this position he will be adequately illuminated from head to foot but his vision will not be impaired by glaring light beams from the source of light.

The invention provides various novel features of construction and arrangement as hereinafter more fully described and particularly pointed out in the claims, reference being had to the accompanying drawings, in which, Fig. 1 is a vertical section of a mirror alcove embodying this invention.

Fig. 2 is a sectional plan on the line 2—2 of Fig. 1.

Fig. 3 is an enlarged fragmentary vertical section illustrating details of the light reflector and beams of light therefrom.

Fig. 4 is a vertical section through a modified form of my invention.

Like numbers refer to like parts in all the figures.

Figure 1:
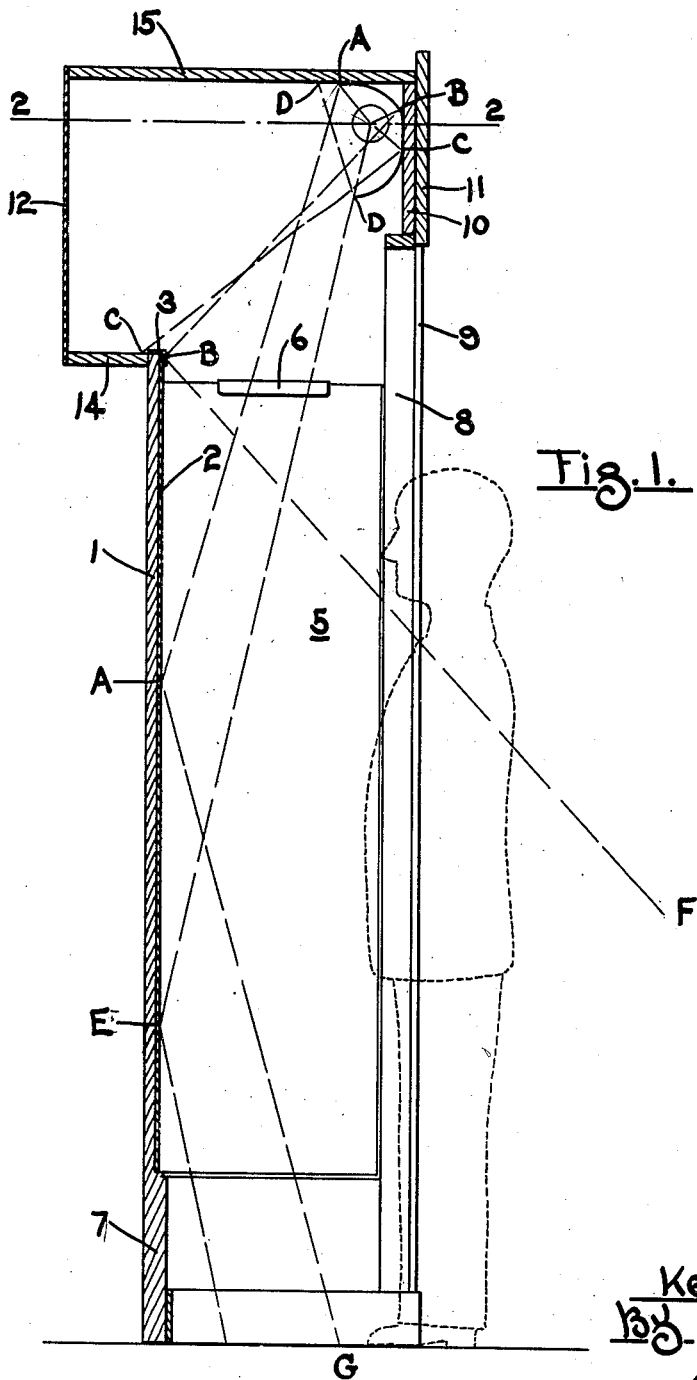

1 represents a vertical support for the back or main mirror 2, the upper edge of which is held in place by the clip 3. The angular vertical side mirrors 5 are held against side supports 4 and their upper edges are retained by the clips 6. Numeral 7 represents the base of the structure which extends upwardly from the floor for a short distance and is not necessarily provided with mirrors.

These mirrors so arranged provide an open front alcove before which the user stands in the position illustrated by dotted lines in Fig. 1 to view himself and the most desirable distance which the user stands from the mirror is approximately that indicated by the dotted line figure. This position is one in which the user may get both a good view of himself in the back mirror 2 and also opposite side views of himself in the side mirrors 5.

The front opening of the alcove is defined by vertical side members 8 and facing strips 9 and a top finishing member 11 supported on framework 10. Above the mirrors an illuminated reflector 12 is located. Filler blocks 13 and 14 are located between the upper edges of the mirrors and the arcuate dull reflector 12. A top 15 is located over the structure and its under surface, similarly to the surface of the arcuate reflector 12, serves as a diffusing reflector and the surfaces of the members 12 and 15 coact to form an upper diffusing reflecting structure.

In the upper forward portion of the structure a source of light 20 is located and is illustrated as an ordinary incandescent electric light bulb. This light is provided with a reflector 16 having reflecting surfaces 17 and 18 and the reflector is held in place by suitable means such as screws 19. The reflector 16 is so constructed that the direct rays of light emanating therefrom will be cast upon substantially the entire reflecting surfaces of the diffusing reflectors 12 and 15 and also the direct rays will be cast against a large part of the surfaces of the mirrors 2 and 5. The lower part 18 of the reflector 16 serves as a light shield and blocks the direct rays of light from any location in which the user might normally stand.

To increase the intensity of the utilized light beams and at the same time to confine and direct them where desired the especially designed reflecting surfaces 17 and 18 are provided. The reflecting surface 18 casts its reflected beams at one extreme along the line C—C and at the other extreme along the line D—D which reflected beams encompass an angle sufficient to illuminate practically the entire reflected surface of the diffusing reflecting structures 12 and 15. This diffused reflected light is cast downwardly and forwardly flooding the entire location before the mirrors including the position in which the user stands. The diffused reflected light, while affording considerable illumination, is soft and unglaring and is not offensive to the eyes of the customer.

Although light is cast upon the mirrors which acts to illuminate them there is no desire nor necessity for illuminating the mirrors but they are used for their light reflecting capacity to illuminate the body of the user before them which is the obect to be illuminated. The reflecting surface 17 intensifies and directs beams of light to the mirrors, these beams being confined within the lines A—A and B—B which are cast on the mirrors near their upper ends and are reflected from the mirrors between the lines B—F and A—G. Direct light is also cast upon the mirror and its lower rays are confined by the shielding effect of the lower part of the reflector 16 at the line D—E.

Therefore, it will be seen that the bright rays, both direct and reflected from the mirrors are confined below the line B—F in the vicinity of the customer and that the area lighted by these bright rays is below the head and eyes of a person standing in normal position before the alcove with the result that the eyes of the user and his vision are not subjected to the direct and glaring rays of light. In other words the user cannot see, either directly or reflected, the source of light although his entire body is flooded with light therefrom. The user's body below the head is lighted by bright reflected light and his entire body is lighted by diffused reflected light and because the upper part of his body, including his head, is closer to the diffusing reflector it is more brilliantly lighted from this source than the lower part of his body while the lower part is strongly lighted by the more intense bright reflected rays which combines to result in an approximate uniformity of illumination from head to foot.

Because the light is reflected upon the body from different reflectors and at different angles unnatural and heavy shadows are avoided. The diffusing light is cast downwardly at a rather acute angle to the vertical while the bright-reflected light from the mirrors is cast upon the body by rays more approaching the horizontal. This absence of unnatural shadows is of course most desirable in fitting clothing for which the mirror alcove is particularly intended. By use of this invention it is wholly practicable to utilize one source of light, that is, one incandescent bulb, for complete and efficient lighting of the body of the user from head to foot and when this lighting is accomplished in the alcove as described the side angularly positioned mirrors, combined with the arcuate shape of the diffusing reflector, serve to light the body at the sides as well as at the front.

It is conceived that various modifications of the specific structure heretofore described may be used within the spirit of the invention. For example, the portion 18 of the reflector may be eliminated or modified in shape so that it will not serve as a light shield as described. In such case, a separate light shield may be used in place of it, such for example as the upper framework 10 of the alcove. Also it is conceived that the shield to prevent the direct rays of light from striking the body of the user, especially above the shoulders, may be eliminated. Rays of light striking the head and face of a person at an angle, nearly vertical, are not greatly objectionable since they will not appreciably impair the person's vision. It is the bright-reflected rays from in front of the user and approaching the horizontal which are most objectionable and which should be kept from the eyes of the user and are therefore confined below his head.

It is also conceived that this means of lighting may be practically applied to one or more mirrors and is not necessarily confined to the mirror alcove illustrated. A single mirror, such as the back mirror, may be used or the back mirror may be eliminated and the two angular side mirrors used with good results. Therefore, it is to be understood that the appended claims are intended to define a lighting structure in combination with one or more mirrors.

In the accompanying drawings the light and reflector are located and designed so that the rays of light are principally reflected from the back mirror but if the back mirror was eliminated and the two angular side mirrors alone used it would probably be desirable to alter the shape of the reflectors so that the light would be more completely directed to the side mirrors and from there reflected to the body of the user.

One modification of my invention is shown in Fig. 4 wherein a back 25, having a reflecting surface 26, is carried upon the base 27.

The back 25 has brackets 28 extending from each side thereof near its top, these brackets revolubly carrying a tubular source of light 30. A reflector 31, having a dull or matte reflecting surface, is rigid with the arms 33, these arms being revolubly mounted upon the brackets 28 so as to rotate about the axis of the bulb or source of light 31. A shield 32, of opaque character, is likewise revolubly mounted so as to turn relatively to the source of light 31. The shield, as shown in the drawings, is of segmental cylindrical shape and its inner surface reflects back the light toward the matte surface of the reflector 31.

The reflector and shield are adjusted to the desired positions as, for instance shown in Fig. 4, and when in these positions the direct rays of the light bulb 30 emanate so as to strike the entire surface of the reflector 31. The direct rays emanate upwardly towards the point H but do not pass to the right of this point because the shield 32 is so dimensioned and positioned as to prevent this. The direct rays are limited by the other or lower edge of the shield 32 so as to pass downwardly to the point L on the mirror. The direct rays also pass the point I of the reflector 31 and are reflected from the mirror at J.

From the above description it will be seen that the direct rays strike the reflecting surface or mirror between the points J and L and that the triangular space subtended between the line J—L, and the lines between J and L and the center of the light source, are subjected to the direct rays from the light source.

One beam from the light source 30, immediately adjacent the point I, strikes at the point J on the mirror and is reflected outwardly to and beyond the point K. This ray of light indicates the inclined plane above which no specular-reflected rays are visible and it is above this plane that the eyes of the observer or customer are located. See Fig. 4. Thus the specular-reflected rays never interfere with the vision of the observer.

The reflector 31, being of dull finish, reflects and diffuses the light from the light source 32 and illuminates the person's head and shoulders to the proper degree.

Whenever desired, the reflector 31 may be tilted so as to cause the diffused light to shine more directly downwardly upon the observer and this consequently raises the plane J, M and K. Thus the figure of the observer is more completely illuminated with a single intensity of light than if the reflector was positioned so as to radiate its light more nearly horizontally.

The point M indicates the junction between the direct rays, the specular-reflected rays and the dull-reflected rays. The space below planes extending through the lines M—L and M—K indicates the space in which the specular-reflected rays prevail.

Although I have mentioned that an ordinary light bulb may be used nevertheless it is to be understood that oftentimes it is desirable to use a combination of two lights, one an incandescent lamp or other yellow or white light, the other a mercury lamp, the two together giving a day-light effect.

Also, although it is preferable to make the superstructure 12 of curved form, nevertheless the shape of this dull reflecting surface might follow the shape of the frames 1 and 5. In this event a better distribution of light would probably be achieved by using two lights rather than one.

The invention is defined in the appended claims and is to be considered comprehensive of all forms of structure coming within their scope.

I claim:

1. A device of the class described comprising a vertical mirror, a continuous mat surface extending from the top of said mirror upwardly and forwardly to a point in front thereof, a light source situated above and in front of said mirror, reflecting means extending arcuately below the light source and beyond a vertical plane passing through the light source to intensify light rays reflected from substantially all of the mat surface and yet to allow direct rays to reach substantially the bottom of the mirror, and a second reflecting means extending arcuately above said light source terminating in substantially a horizontal plane to intensify specular-reflected rays from the upper portion of said mirror.

2. A device of the class described comprising, a vertical mirror substantially equal to the height of a normal person, a mat surface extending above said mirror, a light source situated above and in front of said mirror and reflecting means located in front of said light source and partially surrounding the same, the lower portion of said reflecting means extending to a point substantially vertical with said light source and acting as a shield to prevent light rays to be directed forwardly thereof but permitting direct rays from said light to reach substantially to the bottom of said mirror, the said lower part of the reflector being shaped to reflect light from said source to said mat surface and the upper part of said reflector being so shaped as to reflect rays from said light source to the upper portion of the mirror.

KENNETH C. WELCH.